(12) United States Patent
Taki et al.

(10) Patent No.: US 6,703,138 B1
(45) Date of Patent: Mar. 9, 2004

(54) LAMINATED POLYESTER FILM

(75) Inventors: Hiroshi Taki, Ohtsu (JP); Chikao Morishige, Ohtsu (JP); Shinya Higashiura, Ohtsu (JP); Masayoshi Satoh, Ohtsu (JP)

(73) Assignee: Toyo Boseki Kabushiki Kaisha (JP)

( * ) Notice: Subject to any disclaimer, the term of this patent is extended or adjusted under 35 U.S.C. 154(b) by 0 days.

(21) Appl. No.: 10/110,937

(22) PCT Filed: Oct. 19, 2000

(86) PCT No.: PCT/JP00/07272

§ 371 (c)(1),
(2), (4) Date: Aug. 7, 2002

(87) PCT Pub. No.: WO01/28772

PCT Pub. Date: Apr. 26, 2001

(30) Foreign Application Priority Data

Oct. 19, 1999 (JP) ............................................. 11-297133

(51) Int. Cl.⁷ .......................... B32B 27/08; B32B 27/36; B32B 27/30
(52) U.S. Cl. ......................... 428/483; 428/480; 428/482; 428/910; 428/341; 264/288.4; 264/289.3; 264/289.6; 264/290.2
(58) Field of Search ................................ 428/480, 483, 428/482, 340, 341; 523/165, 176; 264/288.4, 289.3, 289.6, 290.2

(56) References Cited

U.S. PATENT DOCUMENTS

| 4,098,952 A | | 7/1978 | Kelly et al. |
| 5,449,707 A | * | 9/1995 | Higashiura et al. .......... 523/501 |
| 6,194,061 B1 | * | 2/2001 | Satoh et al. ................. 428/341 |
| 6,306,492 B1 | * | 10/2001 | Yamada et al. ........... 428/317.7 |
| 6,391,441 B1 | * | 5/2002 | Yano et al. ................. 428/343 |

FOREIGN PATENT DOCUMENTS

| JP | 52-19786 A | | 2/1977 |
| JP | 52-19787 A | | 2/1977 |
| JP | 53-126084 A | | 11/1978 |
| JP | 55-89330 A | | 7/1980 |
| JP | 55-89331 A | | 7/1980 |
| JP | 61-162337 A | | 7/1986 |
| JP | 02-3307 A | | 1/1990 |
| JP | 02-171243 A | | 7/1990 |
| JP | 02-310048 A | | 12/1990 |
| JP | 03-273015 A | | 12/1991 |
| JP | 04-263937 A | | 9/1992 |
| JP | 05-74463 B2 | | 10/1993 |
| JP | 06-24765 B2 | | 4/1994 |
| JP | 06-39154 B2 | | 5/1994 |
| JP | 06-39548 B2 | | 5/1994 |
| JP | 06-3288646 A | | 11/1994 |
| JP | 10-235820 A | * | 9/1998 |
| JP | 11-300918 A | | 11/1999 |

* cited by examiner

*Primary Examiner*—Vivian Chen
(74) *Attorney, Agent, or Firm*—Kenyon & Kenyon

(57) ABSTRACT

A laminated polyester film in which a coating layer whose main constituent component is a water-soluble or water-dispersible resin is provided on at least one side of a polyester film, wherein the water resistance value of the film is at least 90%, the discoloration after melt molding is no more than 10, and the haze value change after heating is no more than 20%. Adhesion, water resistance, recoverability, and whitening resistance after heating are all excellent.

8 Claims, No Drawings

LAMINATED POLYESTER FILM

FIELD OF THE INVENTION

This invention relates to a laminated polyester film having a coating layer. More particularly, the present invention relates to a laminated polyester film having a coating layer, which has excellent adhesion with a wide range of materials, such as photographic photosensitive layers, diazo photosensitive layers, mat layers, magnetic layers, ink layers, adhesive agent layers, thermosetting resin layers, UV setting resin layers, and vapor deposited layers of metal or inorganic oxides, which has good water resistance and resistance to whitening due to heating, and which, when recovered in the form of scrap film, can be reused as a film raw material.

BACKGROUND OF THE INVENTION

Laminated polyester films which are adhesive find use in a wide range of applications, such as magnetic tape base films, insulating tapes, photographic films, liquid crystal components, antireflective films, tracing films, and food packaging films. Because a polyester film itself does not have sufficient adhesion, its adhesion is generally improved by providing an anchor coat layer to the polyester film.

Many different resins have been proposed as anchor coating resins up to now. For instance, the use of a water-soluble or water-dispersible polyester resin or acrylic resin for a film with relatively high polarity, typically a polyester film, has been proposed in Japanese Unexamined Patent Publication S54-43017, Japanese Examined Patent Publication S49-10243, Japanese Unexamined Patent Publications S52-19787 and S58-124651, and elsewhere. The effect of these prior art techniques, however, was inadequate in terms of improving adhesion.

In order to improve the adhesion of a polyester film, it has been proposed to use various modified polyester resins (mainly involving graft modification) as an anchor coating resin in Japanese Unexamined Patent Publications H2-3307, H2-171243, H2-310048, and H3-273015, Japanese Examined Patent Publication H3-67626, and elsewhere. Nevertheless, while adhesion is indeed increased by using the graft modified polyester resin as an anchor coating resin, a problem is that the adhesion is poor under wet conditions.

Accordingly, it has been proposed to increase adhesion under wet conditions by adding a crosslinking agent in Japanese Examined Patent Publications H5-744633, H6-24765, H6-39154, and H6-39548 and elsewhere.

The use of such crosslinking agents improves adhesion under wet conditions. Nevertheless, during the manufacture of a polyester film when the film which does not become a finished product, i.e., scrap film, is melted and molded into pellets and reused as a film raw material, the resulting film is so low in quality as to make such reuse impractical. Therefore, even though such a coated polyester film has excellent water resistance and adhesion, the scrap film that does not become a finished product during film manufacture is discarded, or used for limited applications or added in a small amount. This increases production cost and also poses a problem from the standpoint of the environmental load imposed by the scrap film.

Other problems are that under the high-temperature environment encountered during or after processing to the film in optical applications and so forth, the film whitens and loses transparency, or microscopic bumps form on its surface. This film whitening and the formation of microscopic surface bumps occur when crystals of polyester oligomer in the film precipitate at the surface.

As a method for suppressing oligomer precipitation at the film surface, it has been proposed to use a polyester with a low oligomer content manufactured by solid phase polymerization (Japanese Unexamined Patent Publications S55-89330 and S55-189331), or to cover a film surface with a polyester having a low oligomer content (Japanese Unexamined Patent Publication H11-300918), etc. However, adhesion, water resistance and recoverability cannot all be improved by these methods alone, and even if these methods are combined with a known coating film technique, it is still impossible to obtain a laminated polyester film whose adhesion, water resistance, recoverability, and resistance to whitening due to heating are all excellent.

Thus, it is an object of the present invention to solve the above-mentioned problems encountered with prior art, and provide a laminated polyester film whose adhesion, water resistance, recoverability, and resistance to whitening due to heating are all excellent.

SUMMARY OF THE INVENTION

The present invention was accomplished in light of the above situation, and the laminated polyester film with which the stated object can be achieved is as follows.

The first invention of the present invention is a laminated polyester film prepared by forming a coating layer comprising as main constituent component a water-soluble or water-dispersible resin on at least one side of a polyester film, the laminated polyester film having a water resistance value of at least 90%, a discoloration value after melt molding of not more than 10, and a haze value change after heating of not more than 20%.

The second invention is the laminated polyester film according to the first invention, wherein the water-soluble or water-dispersible resin is one or more resins or a copolymer resin comprising two or more resins selected from the group consisting of aqueous acrylic resins with an acid value of at least 200 eq/t and aqueous aromatic polyester resins.

The third invention is the laminated polyester film according to the second invention, wherein the water-soluble or water-dispersible resin contains at least 5 wt % of a radical polymer of at least one monomer comprising an acid anhydride containing a double bond.

The fourth invention is the laminated polyester film according to the first, second, or third invention, wherein the coating weight of the coating layer after drying is 0.01 to 1.0 g/m$^2$.

The fifth invention is the laminated polyester film according to the first invention, wherein the film is used for printing applications.

The sixth invention is the laminated polyester film according to the first invention, wherein the film is used as a substrate film for an optical component.

Function

The laminated polyester film of the present invention needs to have a water resistance value at the coating layer surface of at least 90%, with 95% or higher being preferable. If the water resistance value is less than 90%, the adhesion under wet conditions would be inadequate when an ink layer is formed on the coating layer surface of the laminated polyester film. The water resistance value is defined as follows in the present invention. The coating layer surface of the laminated film is coated with a UV-cured sealed ink, and after UV curing, a boiling treatment under pressure is performed for 1 hour at 120° C., and then the peel test according to JIS K 5400 is conducted. The water resistance value defined as the percent area (%) of the remaining ink which is not peeled off.

The laminated polyester film of the present invention needs to have a discoloration value after melt molding of not more than 10. If the discoloration value is over 10, there will be a marked drop in film quality when recovered pellets are used as a film raw material.

The "discoloration value after melt molding" as defined in the present invention is a parameter expressed by the difference in the color b value between a pellet obtained by the melt molding of a laminated polyester film, and the laminated polyester film prior to this melt molding.

More specifically, the laminated polyester film is cut into strips and dried under reduced pressure, and the strips are melt extruded at a temperature of 280° C. with a model test apparatus, and the extrudate is cooled in water and then cut into pellets. These pellets will hereinafter be referred to as "recovered pellets". The color b values of the recovered pellets and of the laminated polyester film prior to the test are measured, and the difference between the two values is defined as the discoloration after melt molding. The "color b value" refers to the b value measured in Lab space with a photoelectric color meter.

The background in which this parameter is used will be described below.

When a polyester film is manufactured, scrap film which is not used in the finished product is invariably generated at the ends held by clips during transverse stretching with a tenter, at the ends which do not meet the finished product width requirement during slitting, in below-grade rolled films, at the beginning and the end of film manufacture, when conditions are changed, and when malfunctions occur. In general, the above-mentioned scrap film is broken into flakes and then melted in an extruder, and the extrudate is discharged from a die in the form of a strand into water and then cut into pellets. The obtained recovered pellets are re-molded and reused as a film raw material. However, because of heat hysteresis built up during the manufacture of the recovered pellets, a film produced using recovered pellets made from a laminated polyester film having a coating layer ends up containing foreign matter which results in fish-eyes, or ends up having low quality due to coloration and so forth. Consequently, scrap film not used as a finished product cannot be reused as a film raw material in applications in which transparency or defects such as coarse protrusions or fish-eyes caused by the foreign matter can pose a problem, particularly in optical applications.

We analyzed this phenomenon in detail, and found in a model test that when a laminated polyester film having a coating layer is re-melted and re-molded into pellets and biaxial stretching is carried out using these pellets as a film raw material to thereby give a film, a discoloration value (discoloration value after melt molding) determined with respect to the obtained film can be used as a parameter for estimating the quality of a laminated film which is actually manufactured using a film raw material containing recovered pellets. As a result, in order to minimize the decrease in the quality of a film in which recovered pellets are used, that is, in order to obtain a recoverable laminated polyester film, the discoloration after melt molding must be 10 or less.

Furthermore, the laminated polyester film of the present invention needs to have a haze value change after heating of not more than 20%, with 15% or less being preferred, and 10% or less being particularly preferable. If the change in haze value is over 20%, whitening of the film becomes so pronounced that the effect on appearance and performance cannot be ignored, particularly in applications in which a heat treatment is performed in an after-processing step, such as in printing or optical applications. "Haze value change after heating" refers to the difference between the haze value of the laminated polyester film after heating it for 30 minutes at 150° C., and the haze value of the laminated polyester film prior to the heating. When the laminated polyester film of the present invention is to be heat-treated in an after-processing step, this parameter is used in quality control to estimate, at the production stage of the laminated polyester film, the degree of whitening of the film caused by the heat-treatment.

Embodiments of the laminated polyester film of the present invention will be described below in detail.

☐Polyester Resin Used for Substrate Film☐

The polyester resin used as the substrate film in the present invention is polyethylene terephthalate, polybutylene terephthalate, polyethylene-2,6-naphthalate, or a copolymer whose main components are the structural components of these resins. Of these, a biaxially oriented film formed from polyethylene terephthalate is particularly preferable. There are no particular restrictions on the method for manufacturing these polymers, and solid phase polymerization may be performed, or a polyester whose oligomer content has been reduced by subjecting these polymers to solvent extraction or the like may be used.

A polycondensation catalyst (a transesterification catalyst may also be used in the case of transesterification) and a thermal stabilizer such as a phosphoric acid or a phosphoric acid compound are used as essential components in the polyester film used in the present invention. Furthermore, addition of a suitable amount of an alkali metal salt or an alkaline earth metal salt is preferable since a sheet of molten polyester resin can be solidified on a rotating cooling roll by electropinning, to thereby obtain an unstretched sheet of uniform thickness. It is also preferable to add inert particles to the substrate polyester film in order to improve the handling characteristics of the film, such as slidability, windability and blocking resistance, and its wear characteristics such as wear resistance and scratch resistance. If desired, various other additives can also be added to the polyester resin. Examples of such additives include antioxidants, light-resisting agents, anti-gelling agents, organic lubricants, antistatic agents, UV absorbers and surfactants.

When the laminated polyester film of the present invention is used as a base film for an optical component, it needs to have excellent handling characteristics while retaining a high degree of transparency☐ Therefore, it is preferable to add fine particles only in the coating layer, with substantially no particles being contained in the substrate film.

Coating Solution

In the present invention, there are no particular restrictions on the water-soluble or water-dispersible resin used for the coating layer on the substrate film, but examples include aqueous polyester resins, aqueous acrylic resins, and aqueous polyurethane resins. Of these, it is preferable to use one or more resins selected from the group consisting of aqueous acrylic resins with an acid value of at least 200 eq/t and aqueous aromatic polyester resins, or a copolymer of two or more of these. The term copolymer here includes both block and graft copolymers.

"Aromatic polyester resin" refers to a polyester resin in which at least 30 mol % of the acid component is an aromatic dicarboxylic acid component. If the aromatic dicarboxylic acid component accounts for less than 30 mol %, the polyester resin becomes much more prone to hydrolysis, and water resistance is lowered.

The acid value of the above-mentioned acrylic resin is determined by using an ethanolic potassium hydroxide solution of known concentration to titrate the solids obtained after a resin solution or the like has been dried for 2 hours at 80° C. under a reduced pressure of 100 Pa. If the acid value is less than 200 eq/t, the acrylic resin is not sufficiently water-soluble or water-dispersible. The acrylic resin, when having an acid value of at least 200 eq/t, is water-soluble or water-dispersible. Polar groups must be contained in the molecules in order for the acid value to be at least 200 eq/t. However, stable polar groups which remain unchanged even when heated, as is the case with sodium sulfonate, are actually undesirable because they lower the water resistance of the coating layer.

Examples of polar groups which do not adversely affect the water resistance of the coating layer are carboxylic acid amine salts which, when heated, decompose to thereby possess decreased polarity. The amine which is used needs to vaporize under the coating film drying conditions, and examples thereof include ammonium, diethylamine, triethylamine and the like.

It is more preferable that one or more resins selected from the group consisting of aqueous acrylic resins with an acid value of at least 200 eq/t or aqueous aromatic polyester resins, or a copolymer of two or more of these, contains at least 5 wt % of a radical polymer of at least one monomer comprising an acid anhydride containing a double bond. The water resistance effect would not be fully produced when the radical polymer content is less than 5 wt %.

Introduction of the above-mentioned acid anhydride into the resin enables the resin molecules to be crosslinked. Specifically, through hydrolysis or the like in the coating solution, the acid anhydride in the resin molecule changes into a carboxylic acid which intermolecularly reacts, due to heat hysteresis during drying and film manufacture, with an acid anhydride or active hydrogen group of other molecules to produce an ester group or the like, crosslinking the resin and thereby imparting water resistance, resistance to whitening due to heating, and other properties.

Examples of monomers containing an double bond-containing acid anhydride include maleic anhydride, itaconic anhydride, 2,5-norbornenedicarboxylic anhydride, and tetrahydrophthalic anhydride. The radical polymer may also be a copolymer of such monomer and other polymerizable unsaturated monomer(s).

Examples of said other polymerizable unsaturated monomers include (1) fumaric acid, monoethyl fumarate, diethyl fumarate, dibutyl fumarate and other monoesters and diesters of fumaric acid, (2) maleic acid, monoethyl maleate, diethyl maleate, dibutyl maleate and other monoesters and diesters of maleic acid, (3) itaconic acid, monoesters and diesters of itaconic acid, (4) phenylmaleimide and other maleimides, (5) styrene, α-methylstyrene, t-butylstyrene, chloromethylstyrene and other styrene derivatives, (6) vinyltoluene, divinylbenzene and so forth, (7) alkyl acrylates, alkyl methacrylates (where the alkyl group may be methyl group, ethyl group, n-propyl group, isopropyl group, n-butyl group, isobutyl group, t-butyl group, 2-ethylhexyl group, cyclohexyl group, phenyl group, benzyl group, phenylethyl group, or the like), and other acrylic polymerizable monomers, (8) 2-hydroxyethyl acrylate, 2-hydroxyethyl methacrylate, 2-hydroxypropyl acrylate, 2-hydroxypropyl methacrylate, and other hydroxyl-containing acrylic monomers, (9) acrylamide, methacrylamide, N-methylmethacrylamide, N-methylacrylamide, N-methylolacrylamide, N-methylolmethacrylamide, N,N-dimethylolacrylamide, N-methoxymethylacrylamide, N-methoxymethylmethacrylamide, N-phenylacrylamide, and other amide group-containing acrylic monomers, (10) N,N-diethylaminoethyl acrylate, N,N-diethylaminoethyl methacrylate, and other amino group-containing acrylic monomers, (11) glycidyl acrylate, glycidyl methacrylate, and other epoxy group-containing acrylic monomers, and (12) acrylic acid, methacrylic acid, salts thereof (sodium, potassium, and ammonium salts) and other acrylic monomers containing carboxyl group or a salt thereof.

The main constituent components of the coating solution used to form the coating layer of the present invention are a water-soluble or water-dispersible resin and an aqueous solvent. As discussed above, it is even more preferable that the water-soluble or water-dispersible resin is one or more resins selected from the group consisting of aqueous acrylic resins with an acid value of at least 200 eq/t and aqueous aromatic polyester resins, or a copolymer of two or more of these, containing at least 5 wt % of a radical polymer of at least one monomer comprising a double bond-containing acid anhydride.

In this case, addition of an acid compound during the preparation of the coating solution is particularly preferable. This addition of an acid compound increases the crosslinking of the resin by promoting acid anhydride conversion and esterification reactions of the carboxylic acid groups in the resin, and is therefore favorable in terms of achieving a water resistance value of at least 90%, which is an important requirement in the laminated polyester film of the present invention.

It is preferable that the acid compound is added in an amount of 1 to 10 wt % based on the resin. A variety of compounds can be used as the acid compound, but preferable is a low-boiling carboxylic acid which readily vaporizes by the heat during film manufacture, seldom remains in the coating layer and less adversely affects the film when it remains. Examples of low-boiling carboxylic acids include formic acid, acetic acid, propionic acid, butyric acid, valeric acid, heptanoic acid and the like.

In the present invention, in order to satisfy the desired water resistance and discoloration values, it is preferable to use a nitrogen atom-free or phenol-free crosslinking agent in the crosslinking reaction using the above-mentioned acid anhydride.

A nitrogen atom-containing or phenol-containing crosslinking agent is oxidized and decomposed when subjected to heat or the like and forms a compound having conjugated structure centered around the nitrogen atom and aromatic ring. As a result, pronounced coloration occurs.

In the present invention, however, the use of these crosslinking agents is not absolutely ruled out, and as long as the water resistance and discoloration values of the present invention are satisfied, these crosslinking agents can be used in an appropriate amount according to the type of the crosslinking agent (curing resin).

Examples of the nitrogen-containing crosslinking agent include (1) adducts of formaldehyde with urea, melamine, benzoguanamine or the like, (2) amino resins such as alkyl ether compounds composed of these adducts and an alcohol having 1 to 6 carbon atoms, (3) polyfunctional epoxy compounds, (4) polyfunctional isocyanate compounds, (5) blocked isocyanate compounds, (6) polyfunctional aziridine compounds, and (7) oxazoline compounds.

Examples of the amino resins mentioned in (2) above include methoxylated methylolurea, methoxylated methylol N,N-ethyleneurea, methoxylated methyloldicyandiamide, methoxylated methylolmelamine, methoxylated methylolbenzoguanamine, butoxylated methylolmelamine, butoxylated methylolbenzoguanamine or the like. Of these, methoxylated methylolmelamine, butoxylated methylolmelamine, methylolated benzoguanamine are preferable.

Examples of the polyfunctional epoxy compounds mentioned in (3) above include a diglycidyl ether of bisphenol A and oligomers thereof, diglycidyl ether of hydrogenated bisphenol A and oligomers thereof, orthophthalic acid diglycidyl ester, isophthalic acid diglycidyl ester, terephthalic acid diglycidyl ester, p-hydroxybenzoic acid diglycidyl ester, tetrahydrophthalic acid diglycidyl ester, hexahydrophthalic acid diglycidyl ester, succinic acid diglycidyl ester, adipic acid diglycidyl ester, sebacic acid diglycidyl ester, ethylene glycol diglycidyl ether, propylene glycol diglycidyl ether, 1,4-butanediol diglycidyl ether, 1,6-hexanediol diglycidyl ether, polyalkylene glycol diglycidyl ethers, trimellitic acid triglycidyl ester, triglycidyl isocyanurate, 1,4-diglycidyloxybenzene, diglycidylpropyleneurea, glycerol triglycidyl ether, trimethylolpropane triglycidyl ether, pentaerythritol triglycidyl ether, and triglycidyl ether of a glycerol alkylene oxide adduct.

Examples of the polyfunctional isocyanate compounds mentioned in (4) above include low- or high-molecular weight aromatic or aliphatic diisocyanates, and trivalent or higher polyisocyanates.

Examples of polyisocyanates include tetramethylene diisocyanate, hexamethylene diisocyanate, toluene diisocyanate, diphenylmethane diisocyanate, hydrogenated diphenylmethane diisocyanate, xylylene diisocyanate, hydrogenated xylylene diisocyanate, isophorone diisocyanate, and trimers of these isocyanate compounds.

Moreover, compounds having one or more terminal isocyanate groups may be used. They are obtained by reacting an excess amount of one of these isocyanate compounds with a low-molecular weight active hydrogen compound such as ethylene glycol, propylene glycol, trimethylolpropane, glycerol, sorbitol, ethylenediamine, monoethanolamine, diethanolamine or triethanolamine, or with a high-molecular weight active hydrogen compound such as a polyester polyol, polyether polyol or polyamide.

The blocked isocyanate mentioned in (5) above can be synthesized by an addition reaction of one of the above-mentioned isocyanate compounds with a blocking agent by a known method.

Examples of the isocyanate blocking agents include (a) phenol compounds such as phenol, cresol, xylenol, resorcinol, nitrophenol, and chlorophenol, (b) thiophenol compounds such as thiophenol and methylthiophenol, (c) oximes such as acetoxime, methyl ethyl ketoxime, and cyclohexanone oxime, (d) alcohols such as methanol, ethanol, propanol and butanol, (e) halogen substituted alcohols such as ethylenechlorohydrine and 1,3-dichloro-2-propanol, (f) tertiary alcohols such as t-butanol and t-pentanol, (g) lactams such as ε-caprolactam, δ-valerolactam, ν-butyrolactam, and β-propyllactam, (h) aromatic amines, (i) imides, (j) active methylene compounds such as acetylacetone, acetoacetate and ethyl malonate, (k) mercaptans, (l) imines, (m) ureas, (n) diaryl compounds, and (o) sodium disulfite.

Examples of phenol-containing crosslinking agents include phenol formaldehyde resins which are condensates of formaldehyde and alkylated phenols, cresols and so forth.

Examples of phenol formaldehyde resins include condensates of formaldehyde and one or more phenols such as alkylated (methyl, ethyl, propyl, isopropyl, or butyl) phenol, p-tert-amylphenol, 4,4'-sec-butylidenephenol, p-tert-butylphenol, o-cresol, m-cresol, p-cresol, p-cyclohexylphenol, 4,4'-isopropylidenephenol, p-nonylphenol, p-octylphenol, 3-pentadecylphenol, phenol, phenyl-o-cresol, p-phenylphenol and xylenol.

In the present invention, it is preferable that the coating solution used to form the coating layer is an aqueous coating solution. In applying this aqueous coating solution to the substrate film surface, it is preferable to add a suitable amount of a known anionic or nonionic surfactant in order to improve the wettability of the substrate film and to apply the coating solution uniformly.

In order to impart other functionalities to the laminated film such as handling characteristics, antistatic properties or antibacterial properties, the aqueous coating solution may contain additives such as inorganic and/or heat-resistant polymer particles, an antistatic agent, a UV absorber, an organic lubricant, an antibacterial agent or a photo-oxidizing agent.

Especially, when the substrate polyester film contains substantially no inert particles, it is preferable, in order to improve the handling characteristics of the film, that inorganic and/or heat-resistant polymer particles be added to the aqueous coating solution so as to form bumps on the coating layer surface. Furthermore, because the coating solution is aqueous, a plurality of water-soluble resins, water-dispersible resins, emulsions, or the like may be added to the coating solution in order to improve performance.

In addition to water, an alcohol such as ethanol, isopropyl alcohol or benzyl alcohol may be added as a solvent to the coating solution in an amount of less than 50 wt % based on the total coating solution. Furthermore, an organic solvent other than the alcohol may also be added in an amount effective for dissolution, provided that the amount thereof is less than 10 wt %. It is preferable, however, that the combined amount of the alcohol and said other organic solvent in the coating solution is less than 50 wt %.

Such organic solvents, when present in an amount of less than 50 wt %, produce the effect of allowing the applied coating solution to dry faster and the effect of giving a coating layer having improved appearance compared to the case where water alone is used. The use of organic solvents in an amount of 50 wt % or higher increases the evaporation rate of the solvents and causes a change in the concentration of the coating solution while it is being applied, with the result that the viscosity of the coating solution increases and the solution will be more difficult to apply. As a result, the resulting coating layer is likely to have an inferior appearance. Furthermore, exceeding this amount is undesirable in terms of the environment, operators' health, fire hazard and so on.

Manufacturing a Laminated Polyester Film

The method for manufacturing the laminated polyester film of the present invention will now be described by using a polyethylene terephthalate (hereinafter referred to as PET) film as an example, but naturally the present invention is not limited to this embodiment.

A PET resin is thoroughly vacuum dried and fed to an extruder. The molten PET resin at approximately 280° C. is melt extruded in the form of a sheet from a T-die onto a rotating cooling roll, and is cooled and solidified by electropinning to obtain an unstretched PET sheet. This unstretched PET sheet may be in a single layer structure, or in a multilayer structure obtained by co-extrusion. For applications which demand a high level of transparency, such as optical applications, it is preferable that the PET resin contain substantially no inert particles.

The unstretched PET sheet thus obtained is stretched 2.5 to 5.0 times in the longitudinal with a roll heated at 80 to 120° C., to give a monoaxially oriented PET film. The ends of the film are clamped with clips, and the film is guided into a hot-air zone heated at 70 to 140° C. and stretched 2.5 to 5.0 times in the transverse direction. It is then conveyed into a heat treatment zone of 160 to 240° C., where it is heat treated for 1 to 60 seconds to complete crystal orientation.

At some step in the course of this film manufacture, at least one side of the PET film is coated with an aqueous coating solution comprising as main components the above-mentioned water-soluble or water-dispersible resin and an aqueous solvent. The coating layer may be formed on only one side of the PET film, but forming a coating layer on both sides of the PET film is even more effective for preventing the oligomer precipitation at the film surface and for minimizing the increase in haze value after film heating.

It is preferable that the solids concentration of the resin composition in the aqueous coating solution is 5 to 35 wt %, more preferably 7 to 15 wt %.

Any known methods can be employed to coat the PET film with this aqueous coating solution. Examples include reverse roll coating, gravure coating, kiss coating, die coating, roll brushing, spray coating, air knife coating, wire bar coating, pipe doctoring, dip coating, and curtain coating. These methods can be performed singly or in combinations.

The coating layer may be provided by coating a biaxially oriented PET film with the above-mentioned coating solution and then drying the coating (offline coating), or by coating an unstretched or monoaxially oriented PET film with the above-mentioned coating solution, drying the coating, and then drawing at least in one direction and performing a thermosetting treatment (inline coating).

The latter method (inline coating) is preferred from the standpoint of the effect of the present invention. After being coated with the coating solution, the film is guided to a tenter and heated for transverse drawing and thermosetting. A stable coating layer can be formed here because of the thermal crosslinking reaction.

In the case of the so-called inline coating method, in which an unstretched or uniaxially oriented PET film is coated with the above-mentioned coating solution and then dried and stretched, the temperature and time is selected such that only the water or other solvent is removed in the drying step following coating and that the coating layer does not undergo a crosslinking reaction.

It is preferable that the drying temperature is 70 to 140° C., and while the drying time is adjusted as dictated by the coating solution and the coating amount, it is preferable that the product of multiplying the temperature (° C.) by the time (seconds) is 3000 or less. If this product is over 3000, a crosslinking reaction will commence in the coating layer prior to stretching, causing cracking and so forth in the coating layer, thereby making it difficult to achieve the object of the present invention.

The stretched film is usually subjected to a relaxation treatment of about 2 to 10%, and in the present invention the coating layer is preferably heated with an infrared heater in a low-strain state, that is, a state in which the length of the film is fixed in the transverse direction. It is particularly preferable that the above-mentioned coating layer be heated for a short time of 0.5 to 1 second at 250 to 260° C.

The use of this method further promotes the crosslinking of the resin in the coating layer, and the resin becomes even stronger, thereby better achieving the effects of the present invention, i.e., water resistance and resistance to whitening due to heating.

It is not preferable that either the temperature or the time for the heating with the infrared heater is over the preferable range given above, since the film will be prone to crystallization or melting. On the other hand, if the heating temperature or heating time is below the preferable range given above, inadequate crosslinking of the coating layer tends to occur, and results in insufficient water resistance and resistance to whitening due to heating.

It is preferable that the coating amount of the coating layer in the laminated polyester film eventually obtained in the present invention is from 0.01 to 1.0 $g/m^2$. A coating amount of less than 0.01 $g/m^2$ gives a coating layer having substantially no adhesion. On the other hand, or coating amount exceeding 1.0 $g/m^2$ will adversely affect recoverability.

The coating layer of the laminated polyester film of the present invention has good adhesion to a variety of materials, but in order to further improve adhesion and printability, the coating layer may be further subjected to surface treatment by corona discharge treatment, flame treatment, electron beam irradiation or the like, if so desired.

The coating layer of the laminated polyester film obtained according to the present invention affords good adhesive strength in a wide range of applications. Specific examples include photographic photosensitive layers, diazo photosensitive layers, mat layers, magnetic layers, ink jet ink receiving layers, hard coat layers, UV-cured resins, thermosetting resins, printing inks, UV inks, adhesive agents for dry lamination or extrusion lamination, thin film layers obtained by plasma polymerization, CVD, ion plating, sputtering, electron beam deposition, or vacuum vapor deposition of metals or inorganic substances or oxides of these, and organic barrier layers.

EXAMPLES

The present invention will be described below in detail with reference to examples and comparative examples. However, the present invention is not, of course, limited to the examples given below. The evaluation methods used in the present invention are as follows.

(1) Adhesion

The coating layer side of a film was coated with a hard coating agent (Seikabeam EFX01 (B), made by Dainichiseika) using a #8 wire bar. The coating was dried for 1 minute at 70° C. to remove the solvent. Then, a high pressure mercury vapor lamp was used to form a hard coating layer with a thickness of 3 $\mu$m at an irradiation energy of 200 $mJ/cm^2$ and an irradiation distance of 15 cm while the film was fed at a speed of 5 m/minute.

The film thus obtained was tested for adhesion according to the test method described in JIS K 5400, section 8.5.1. Specifically, using a cutter guide with a spacing of 2 mm, the film was scored all the way through the hard coating layer and coating layer of the laminated polyester film down to the substrate film, producing 100 squares. Cellophane adhesive tape (No. 405, made by Nichiban; 24 mm wide) was stuck to the scored squares and then rubbed with an eraser until it adhered completely. After this, the cellophane adhesive tape was peeled away from the film perpendicularly, and the number of squares peeled off from the film was counted. The adhesion was determined from the following equation. Any partially peeled squares were counted as having peeled.

Adhesion (%)=(1−number of peeled squares/100)×100

(2) Water Resistance

The polyester film produced by the method given in (1) above, which had a hard coating layer with a thickness of 3 $\mu$m provided on the coating layer, was immersed in warm water at 60° C. for 168 hours. The film was then taken out of the water, and the water clinging to the film surface was removed, and the film was left at room temperature for 12 hours.

The adhesion was then calculated by the same method as in (1) above, and was ranked on the following scale.

⊚: 100%

○: 99 to 96%

Δ: 95 to 80%

X: 79 to 0%

(3) Water Resistance Value

An offset ink (Best Cure 161, made by T & K Toka) was transferred with an RI tester (RI-3, made by Akira Seisakusho) onto the coating layer surface of the film. Then, a high pressure mercury vapor lamp was used to form an ink layer with a thickness of 1 μm at an irradiation energy of 200 mJ/cm$^2$ and an irradiation distance of 15 cm while the film was fed at a rate of 5 m/minute.

The film thus obtained was placed in an autoclave (SR-240, made by Tomy Seiko) containing water, and a boiling treatment under pressure was performed for 1 hour at 120° C. After this boiling treatment, the pressure in the autoclave was reduced to normal pressure and the film was taken out of the autoclave. Any water clinging to the film surface was removed, and the film was left to stand at room temperature for 12 hours.

The surface on the ink layer side of the film after the boiling treatment was then subjected to a peel test in the same manner as in (1) above, and the water resistance value was calculated from the following equation. Any partially peeled squares were counted as having peeled.

Water resistance value (%)=(1−number of peeled squares/100)×100

(4) Color Tone

The Lab values were measured with a color meter (Z-1001DP, made by Nippon Denshoku), and the b value was used.

(5) Discoloration Value After Melt Molding

The laminated polyester film having a coating layer was cut into strips, dried for 6 hours at 135° C. at a reduced pressure of 133 Pa, and then fed to an extruder (PCM-30, made by Iketomo Tekkosha). The molten resin was extruded in the form of a strand from a nozzle with a diameter of 5 mm at a discharge rate of 200 g/minute, a cylinder temperature of 280° C., and a rotating speed of 80 rpm, and then the strand was cooled in a water tank and cut to obtain recovered pellets. It took 130 seconds from the start of the feeding of the film strips to the extruder until the molten resin began to flow out of the nozzle.

The b value of these recovered pellets (b) and the b value of the laminated film prior to the test ($b_0$) were measured by a color meter, and the difference between these values was defined as discoloration value after melt molding.

Discoloration=$b-b_0$ (6) Foreign Matter in Film

PET resin pellets (used as the film raw material polymer) that had an intrinsic viscosity of 0.62 dl/g and contained substantially no particles were mixed with the recovered pellets produced in (5) above in a weight ratio of 60:40, and this pellet mixture was dried for 6 hours at 135° C. at a reduced pressure of 133 Pa.

After drying, the pellet mixture was fed to an extruder (PCM-30, made by Iketomo Tekkosha), melted and extruded from a T-die in the form of a sheet at a cylinder temperature of 280° C., a discharge rate of 250 g/minute, and a rotating speed of 150 rpm, and quickly cooled and solidified on a metal roll whose surface temperature was maintained at 20° C., by electropinning to prepare an unstretched sheet having a thickness of 1400 μm. It took 310 seconds from the start of the supply of the film strips to the extruder until the molten resin began to flow out from the T-die.

Then, this unstretched sheet was heated to 100° C. with an infrared heater and a group of heated rolls, and stretched to 3.5 times in the longitudinal direction by using a group of rolls having differences in peripheral velocity to prepare a monoaxially oriented PET film. Then, the ends of the film were clamped with clips, and the film was guided to a hot-air zone heated at 130° C. where it was dried. Subsequently, the dried film was stretched to 4.0 times in the transverse direction, giving a biaxially oriented PET film with a thickness of 100 μm.

The film thus obtained was cut into a piece measuring 250 mm×250 mm and examined under a scaled microscope, and the number of foreign particles having a diameter of at least 20 μm (when observed perpendicular to the film surface) was counted for the entire 250 mm×250 mm (0.0625 m$^2$) range. This counting was performed for 10 film pieces, and the total number of foreign particles thus counted was divided by the total observed area (0.625 m$^2$) to calculate the number of foreign particles per unit area 1 m$^2$ (number/m$^2$), and this number was rounded off to the nearest whole number. The number of foreign particles per square meter was ranked on the following scale.

⊚: 0 per m$^2$

○: 1 to 3 per m$^2$

Δ: 4 to 6 per m$^2$

X: 7 or more per m$^2$ (7) Film Appearance

The film obtained above was observed using transmitted light and reflected light, and the condition of the film was observed visually and ranked on the following scale. This observation was carried out by five specialists trained in such evaluation, and the most common ranking was used as the evaluation ranking. If two rankings received the same number of votes, the middle of the three different rankings was used. For instance, if "⊚" and "○" each received two votes, and "Δ" one vote, a ranking of "○" was given; if "⊚" received one vote and "○" and "Δ" each received two votes, a ranking of "○" was given; and if "⊚" and "Δ" each received two votes, and "⊚" one vote, a ranking of "⊚" was given.

⊚: no discoloration, transparent and uniform

⊚: slight discoloration, but transparent and uniform

Δ: discoloration, with some cloudiness noted

X: marked discoloration, with cloudy or opaque portions noted (8) Haze Value Change After Heating The film was cut into two strips measuring 8 cm×10 cm, and measurements were made twice at 8 points on each with a haze meter (TC-H3DP, made by Tokyo Denshoku). The average of the measurement values at the 16 points was termed the initial haze value $H_0$ (%). These film strips were held by clips and heated for 30 minutes in a 150° C. hot air oven. The films were allowed to cool naturally, and the haze value after heating $H_1$ (%) was measured in the same manner as the above-mentioned initial haze value $H_0$. The difference between these haze values ($H_1-H_0$) is defined as the haze value change after heating.

Preparation of Copolymer Polyester Resin

Into a stainless steel autoclave equipped with a stirrer, a thermometer and a partial reflux condenser were placed 163 weight parts of dimethyl terephthalate, 163 weight parts of dimethyl isophthalate, 169 weight parts of 1,4-butanediol, 324 weight parts of ethylene glycol, and 0.5 weight part of tetra-n-butyl titanate. A transesterification reaction was conducted over a period of 4 hours while the temperature was raised from 160° C. to 220° C.

Then, 14 weight parts of fumaric acid and 203 weight parts of sebacic acid were added, and an esterification reaction was conducted while the temperature was raised from 200° C. to 220° C. over a period of 1 hour. The temperature was then raised to 255° C. and the pressure of reaction system was gradually reduced, and then the reaction was continued for 1 hour and 30 minutes at a reduced pressure of 29 Pa, giving a copolymer polyester resin (A-1). The copolymer polyester resin thus obtained was transparent and pale yellow in color.

Copolymer polyester resins of other compositions (A-2 and A-3) were obtained by the same method. Table 1 shows the composition as measured by NMR and weight average molecular weight for A-1, A-2, and A-3.

TABLE 1

| Copolymer composition (mol %) | A-1 | A-2 | A-3 |
| --- | --- | --- | --- |
| terephthalic acid | 33 | 46 | 48 |
| sebacic acid | 30 | — | — |
| isophthalic acid | 33 | 46 | 48 |
| sodium 5-sulfonatoisophthalic acid | — | 4 | 4 |
| fumaric acid | 4 | 4 | — |
| ethylene glycol | 60 | 60 | 60 |
| 1,4-butanediol | 40 | 40 | 40 |
| Weight average molecular weight | 18000 | 15000 | 19000 |
| Aromatic component (mol %) | 66 | 96 | 100 |

Example 1

(1) Manufacture of Graft Resin

To a reactor equipped with a stirrer, a thermometer, a reflux condenser and a metered dropping apparatus were added 75 weight parts of copolymer polyester resin (A-1), 56 weight parts of methyl ethyl ketone, and 19 weight parts of isopropyl alcohol. The contents were heated to 65° C. and stirred, and the resin was dissolved. Once the resin was completely dissolved, 15 weight parts of maleic anhydride were added to the polyester solution.

10 weight parts of styrene and 1.5 weight parts of azobisdimethylvaleronitrile were dissolved in 12 weight parts of methyl ethyl ketone, the resulting solution was added dropwise to a polyester solution at a rate of 0.1 mL/min, and continuously stirred for another 2 hours. An analysis sample was taken from the reaction solution, and then 5 weight parts of methanol was added. To the reaction solution were then added 300 weight parts of water and 15 weight parts of triethylamine, and the system was stirred for 1 hour.

The temperature inside the reactor was then raised to 100° C. and the methyl ethyl ketone, isopropyl alcohol, and excess triethylamine were distilled off, giving a water-dispersible graft copolymer resin B-1. This water-dispersible graft resin B-1 was transparent and pale yellow in color. The acid value of this graft copolymer was 1400 eq/t.

(2) Preparation of Coating Solution 40 weight parts of a 25 wt % aqueous dispersion of the water-dispersible graft resin B-1 obtained above, 24 weight parts of water, and 36 weight parts of isopropyl alcohol were mixed, and to the mixture were added propionic acid and an anionic surfactant in an amount of 1 wt % each with respect to the coating solution, and an aqueous dispersion of colloidal silica fines (Snowtex OL, made by Nissan Chemical Industries; average particle diameter: 40 nm) in an amount of 5 wt % silica with respect to the resin solids, thereby preparing a coating solution (hereinafter referred to as coating solution C-1).

(3) Manufacture of a Laminated Polyester Film Having a Coating Layer

PET resin pellets (used as the film raw material polymer) that had an intrinsic viscosity of 0.62 dL/g and contained substantially no particles were dried for 6 hours at 135° C. at a reduced pressure of 133 Pa. They were then supplied to a biaxial-extruder, melted and extruded in the form of a sheet-at approximately 280° C., and quickly cooled and solidified on a rotating matal roll whose surface temperature was maintained at 20° C., and adhered to each other by electropinning to prepare an unstretched PET sheet having a thickness of 1400 µm.

This unstretched sheet was heated to 100° C. by a group of heated rolls and an infrared heater, and stretched to 3.5 times in the longitudinal direction by using a group of rolls having differences of peripheral velocity to prepare a monoaxially oriented PET film.

Both sides of the PET film were then coated by the reverse roll method with the above-mentioned coating solution C-1 such that the coating amount after drying would be 0.6 g/m$^2$, and the coatings were dried for 20 seconds at 80° C. After drying, the film was stretched to 4.0 times in the transverse direction by a tenter at 120° C., the coating layer was heated for 0.5 second at 260° C. with an infrared heater with the length fixed in the transverse direction of the film, then a relaxation treatment of 3% in the transverse direction was performed for 23 seconds at 200° C., giving a biaxially oriented PET film with a thickness of 100 µm. The evaluation results are given in Table 2.

Example 2

A coating solution C-2 was obtained by the same method as above, except that the 15 weight parts of maleic anhydride and 10 weight parts of styrene were changed to 10 weight parts of maleic anhydride, 7 weight parts of styrene, and 8 weight parts of ethyl acrylate. The acid value of this graft copolymer was 950 eq/t. This coating solution was used to obtain a laminated biaxially oriented PET film by the same method as in Example 1. The evaluation results are given in Table 2.

Example 3

A coating solution C-3 was obtained by the same method as in Example 1, except that the copolymer polyester resin was changed to A-2. The acid value of this graft copolymer was 1370 eq/t. This coating solution was used to obtain a laminated biaxially oriented PET film by the same method as in Example 1. The evaluation results are given in Table 2.

Example 4

A laminated biaxially oriented PET film was obtained by the same method as in Example 1, except that the thickness of the unstretched PET sheet was changed to 2632 µm, the thickness of the PET film after biaxial stretching was changed to 188 µm, the drying conditions after coating were changed to 40 seconds at 70° C., thermal fixing was performed for 0.6 second at 260° C., and a relaxation treatment of 3% was performed for 47 seconds at 200° C. The evaluation results are given in Table 2.

Example 5

A laminated biaxially oriented PET film was obtained by the same method as in Example 1, except that 1 weight part of a self-crosslinking polyurethane resin having blocked isocyanate groups (Elastron H-3, made by Dai-ichi Kogyo Seiyaku) and 0.1 weight part of an Elastron catalyst (Cat64, made by Dai-ichi Kogyo Seiyaku) were added per 100 weight parts of the coating solution C-3. The evaluation results are given in Table 2.

Example 6

A laminated biaxially oriented PET film was obtained by the same method as in Example 1, except that the coating solution C-1 used in Example 1 was applied by the reverse roll method, to only one side of the PET film. The evaluation results are given in Table 2.

Comparative Example 1

A laminated biaxially oriented PET film was obtained by the same method as in Example 1, except that only an aqueous dispersion of the copolymer polyester resin A-3 was used as a coating solution C-4. The evaluation results are given in Table 2.

Comparative Example 2

A laminated biaxially oriented PET film was obtained by the same method as in Example 1, except that 10 weight parts of a self-crosslinking polyurethane resin having blocked isocyanate groups (Elastron H-3, made by Dai-ichi Kogyo Seiyaku) and 1 weight part of an Elastron catalyst (Cat64, made by Dai-ichi Kogyo Seiyaku) were added per 100 weight parts of the coating solution C-4. The evaluation results are given in Table 2.

Comparative Example 3

A laminated biaxially oriented PET film was obtained by the same method as in Example 1, except that 10 weight parts of melamine resin (Sumimal M40W, made by Sumitomo Chemical) and 0.02 weight part p-toluenesulfonic acid were added per 100 weight parts of the coating solution C-4. The evaluation results are given in Table 2.

Comparative Example 4

A laminated biaxially oriented PET film was obtained by the same method as in Example 1, except that 20 weight parts melamine resin (Sumimal M40W, made by Sumitomo Chemical) and 0.05 weight part p-toluenesulfonic acid were added per 100 weight parts of the coating solution C-4. The evaluation results are given in Table 2.

Comparative Example 5

A laminated biaxially oriented PET film was obtained by the same method as in Comparative Example 1, except that an acrylic copolymer resin A-4 synthesized from methyl methacrylate, ethyl acrylate, and 2-hydroxyethyl acrylate was used instead of the copolymer polyester resin A-3. The acid value of this copolymer was 2 eq/t. The evaluation results are given in Table 2.

Comparative Example 6

A laminated biaxially oriented PET film was obtained by the same method as in Example 1, except that no propionic acid was added to the coating solution. The evaluation results are given in Table 2.

Comparative Example 7

A laminated biaxially oriented PET film was obtained by the same method as in Example 1, except that the coating layer was not heated with an infrared heater. The evaluation results are given in Table 2.

INDUSTRIAL APPLICABILITY

The present invention provides a laminated polyester film with excellent adhesion and water resistance, and therefore can be used in applications involving a wide range of materials, such as photographic photosensitive layers, diazo photosensitive layers, mat layers, magnetic layers, ink layers, adhesive agent layers, thermosetting resin layers, UV-cured resin layers, and vapor deposited layers of metal or inorganic oxides. Because there is little haze value change after heating, this film is favorable as a base film for optical components and in printing applications that involve heat treatment in an after-processing step. Furthermore, since any scrap film which does not become a finished product in the film manufacture can be recovered and reused as a film raw material, the present invention is also useful from the standpoints of cost and environmental protection.

TABLE 2

| | Adhesion | Water resistance value | Discoloration after melt molding | Change in haze value after heating | Water resistance | Film from recovered pellets | |
|---|---|---|---|---|---|---|---|
| | | | | | | Foreign matter | Appearance |
| Ex. 1 | 100 | 100 | 3.7 | 8.6 | ⊙ | ○ | ○ |
| Ex. 2 | 100 | 100 | 3.9 | 9.3 | ⊙ | ○ | ○ |
| Ex. 3 | 100 | 98 | 4.6 | 7.5 | ○ | ○ | ○ |
| Ex. 4 | 100 | 100 | 2.9 | 8.0 | ⊙ | ○ | ○ |
| Ex. 5 | 100 | 100 | 6.8 | 9.8 | ⊙ | ○ | ○ |
| Ex. 6 | 100 | 100 | 3.2 | 13.4 | ⊙ | ○ | ○ |
| Comp. Ex. 1 | 95 | 10 | 4.3 | 14.3 | Δ | ○ | Δ |
| Comp. Ex. 2 | 100 | 60 | 12.9 | 23.1 | x | Δ | x |
| Comp. Ex. 3 | 100 | 70 | 11.4 | 14.7 | Δ | x | x |
| Comp. Ex. 4 | 100 | 90 | 16.0 | 11.0 | ○ | x | x |
| Comp. Ex. 5 | 75 | 25 | 4.2 | 17.0 | x | ○ | Δ |
| Comp. Ex. 6 | 80 | 85 | 3.5 | 24.0 | Δ | ○ | ○ |
| Comp. Ex. 7 | 80 | 70 | 3.6 | 22.6 | Δ | ○ | ○ |

What is claimed is:

1. A laminated polyester film having a coating layer formed by using an aqueous coating solution which comprises mainly an aqueous solvent and a water-soluble or water-dispersible resin, and is substantially free from phenolic and nitrogenous crosslinking agents on at least one side of the polyester film, the water-soluble or water-dispersible resin comprising one of (a)–(c) below:
  (a) a graft copolymer of an aqueous aromatic polyester resin containing at least 5% by weight of a radical polymer at least one of whose monomers comprises an acid anhydride having a double bond;
  (b) an aqueous acrylic resin, other than (c) below, having an acid value of at least 200 eq/t, or a copolymer of such a resin; or
  (c) a graft copolymer of an aqueous acrylic resin containing at least 5% by weight of a radical polymer at least one of whose monomers comprises an acid anhydride having a double bond, the acid value of the aqueous acrylic resin being at least 200 eq/t;

wherein the laminated film has a water resistance value of at least 90%, as determined by forming an ink layer on the coating layer side of the laminated film, performing a boiling treatment under pressure for an hour at 120° C., conducting a peel test according to JIS K 5400, and measuring the area (%) of the remained ink that is not peeled off;

the difference between the b value of recovered pellets obtained by melt extruding the laminated film at 280° C. and the b value of the laminated film before melting (discoloration value after melt molding) is not more than 10; and the difference between the haze value of the laminated film after heating for 30 minutes at 150° C. and the haze value of the laminated film before heating (change in haze value after heating) is not more than 20%.

2. The laminated polyester film according to claim 1, wherein the coating solution further comprises a crosslinking agent free from phenolic or nitrogenous components.

3. The laminated polyester film according to claim 1, wherein the coating solution further comprises an acid compound.

4. The laminated polyester film according to claim 1, wherein the coating weight of the coating layer after drying is 0.01 to 1.0 g/m².

5. The laminated polyester film according to claim 1, wherein the film is used for printing applications.

6. The laminated polyester film according to claim 1, wherein the film is used as a substrate film for an optical component.

7. A method for producing a laminated polyester film comprising the steps of:

applying an aqueous coating solution which comprises mainly an aqueous solvent and a water-soluble or water-dispersible resin, and is substantially free from phenolic and nitrogenous crosslinking agents on at least one side of an unstretched polyester film on at least one side of a uniaxially oriented polyester film to form a coating layer;

drying the film;

orienting the film at least in one axial direction; and performing thermal fixing and crosslinking of the resin;

the water-soluble or water-dispersible resin comprising one of (a)–(c) below:
  (a) a graft copolymer of an aqueous aromatic polyester resin containing at least 5% by weight of a radical polymer at least one of whose monomers comprises an acid anhydride having a double bond;
  (b) an aqueous acrylic resin, excluding (c) below, having an acid value of at least 200 eq/t, or a copolymer of such a resin; or
  (c) a graft copolymer of an aqueous acrylic resin containing at least 5% by weight of a radical polymer at least one of whose monomers comprises an acid anhydride having a double bond, the acid value of the aqueous acrylic resin being at least 200 eq/t;

wherein the crosslinking step is performed by (i) adding an acid compound to the coating solution, (ii) heating the coating layer with an infrared heater in a manner such that the length of the film is fixed in the transverse direction, or (iii) both.

8. The method for producing a laminated polyester film according to claim 7, wherein the coating solution further comprises a crosslinking agent free from phenolic and nitrogenous components.

* * * * *

UNITED STATES PATENT AND TRADEMARK OFFICE
CERTIFICATE OF CORRECTION

PATENT NO. : 6,703,138 B1
DATED : March 9, 2004
INVENTOR(S) : Hiroshi Taki et al.

It is certified that error appears in the above-identified patent and that said Letters Patent is hereby corrected as shown below:

Column 12,
Line 49, change "◎: slight discoloration" to -- ○: slight discoloration --.

Column 16,
Lines 52-65, change Table 2 to read as follows:

|  | Adhesion | Water resistance value | Discoloration after melt molding | Change in haze value after heating | Water resistance | Film from recovered pellets | |
|---|---|---|---|---|---|---|---|
|  |  |  |  |  |  | Foreign matter | Appearance |
| Ex. 1 | 100 | 100 | 3.7 | 8.6 | ◎ | ○ | ○ |
| Ex. 2 | 100 | 100 | 3.9 | 9.3 | ◎ | ○ | ○ |
| Ex. 3 | 100 | 98 | 4.6 | 7.5 | ○ | ○ | ○ |
| Ex. 4 | 100 | 100 | 2.9 | 8.0 | ◎ | ○ | ○ |
| Ex. 5 | 100 | 100 | 6.8 | 9.8 | ◎ | ○ | ○ |
| Ex. 6 | 100 | 100 | 3.2 | 13.4 | ◎ | ○ | ○ |
| Comp. Ex. 1 | 95 | 10 | 4.3 | 14.3 | △ | ○ | △ |
| Comp. Ex. 2 | 100 | 60 | 12.9 | 23.1 | × | △ | × |
| Comp. Ex. 3 | 100 | 70 | 11.4 | 14.7 | △ | × | × |
| Comp. Ex. 4 | 100 | 90 | 16.0 | 11.0 | ○ | × | × |
| Comp. Ex. 5 | 75 | 25 | 4.2 | 17.0 | × | ○ | △ |
| Comp. Ex. 6 | 80 | 85 | 3.5 | 24.0 | △ | ○ | ○ |
| Comp. Ex. 7 | 80 | 70 | 3.6 | 22.6 | △ | ○ | ○ |

Signed and Sealed this

Ninth Day of November, 2004

JON W. DUDAS
*Director of the United States Patent and Trademark Office*